(12) United States Patent
Li et al.

(10) Patent No.: US 9,300,150 B2
(45) Date of Patent: Mar. 29, 2016

(54) VARIABLE ORIENTATION FOR CHARGING COILS

(71) Applicant: Lenovo (Singapore) Pte. Ltd., Singapore (SG)

(72) Inventors: Jian Li, Chapel Hill, NC (US); Scott Edwards Kelso, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 356 days.

(21) Appl. No.: 13/772,830

(22) Filed: Feb. 21, 2013

(65) Prior Publication Data

US 2014/0232329 A1     Aug. 21, 2014

(51) Int. Cl.
*H02J 7/00*    (2006.01)
(52) U.S. Cl.
CPC ............. *H02J 7/0042* (2013.01); *H02J 7/0052* (2013.01)
(58) Field of Classification Search
CPC ......... H02J 7/025; H02J 5/005; H02J 7/0004; B60L 11/1831; H01F 38/14
USPC .......................................................... 320/108
See application file for complete search history.

(56) References Cited

U.S. PATENT DOCUMENTS

| | | | |
|---|---|---|---|
| 2004/0145342 A1* | 7/2004 | Lyon | 320/108 |
| 2011/0276111 A1* | 11/2011 | Carbunaru et al. | 607/61 |
| 2013/0288600 A1* | 10/2013 | Kuusilinna | H02J 7/0004 455/41.2 |

* cited by examiner

*Primary Examiner* — Nghia Doan
(74) *Attorney, Agent, or Firm* — Ference & Associates LLC

(57) ABSTRACT

An aspect provides an information handling device, including: one or more processors; a memory device assessable to the one or more processors and storing code executable by the one or more processors; one or more rechargeable batteries providing power to one or more of the one or more processors and the memory device; and a wireless charging coil system operatively coupled to the one or more rechargeable batteries; the wireless charging coil system comprising two or more coil portions oriented at an angle with respect to one another such that the two or more coil portions are aligned along two or more charging planes. Other aspects are described and claimed.

16 Claims, 3 Drawing Sheets

VARIABLE ORIENTATION FOR CHARGING COILS

BACKGROUND

Information handling devices ("devices") come in a variety of forms, for example laptop computing devices, tablet computing devices, smart phones, e-readers, MP3 players, and the like. Many such devices are mobile and thus configured for use with a rechargeable battery.

The battery may be charged via a wired connection or may be wirelessly charged. Wireless charging arrangements operate using the principle of induced current. The wireless charging arrangements use transfer coils (herein referred to as "Tx coils"), e.g., in a coiling pad, oriented together to produce electromagnetic induction to produce a charging current in receiving coils (herein referred to as "Rx coils") of the information handling device. The charging current may in turn be provided to the battery to charge the same using a suitable connection/circuitry.

BRIEF SUMMARY

In summary, one aspect provides an information handling device, comprising: one or more processors; a memory device assessable to the one or more processors and storing code executable by the one or more processors; one or more rechargeable batteries providing power to one or more of the one or more processors and the memory device; and a wireless charging coil system operatively coupled to the one or more rechargeable batteries; the wireless charging coil system comprising two or more coil portions oriented at an angle with respect to one another such that the two or more coil portions are aligned along two or more charging planes.

Another aspect provides a wireless charging coil system, comprising: two or more coil portions oriented at an angle with respect to one another such that the two or more coil portions are aligned along two or more charging planes; circuitry to operatively couple the two or more coil portions to an information handling device rechargeable battery.

A further aspect provides a wireless charging coil system, comprising: two or more coil portions oriented at an angle with respect to one another such that the two or more coil portions are aligned along two or more charging planes; circuitry providing the two or more coil portions charge to create a magnetic flux in the two or more coil portions.

A still further aspect provides a method, comprising: placing an information handling device in proximity to a wireless charger; and charging one or more rechargeable batteries using a wireless charging coil system operatively coupled to one or more rechargeable batteries; the wireless charging coil system comprising two or more coil portions oriented at an angle with respect to one another such that the two or more coil portions are aligned along two or more charging planes.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
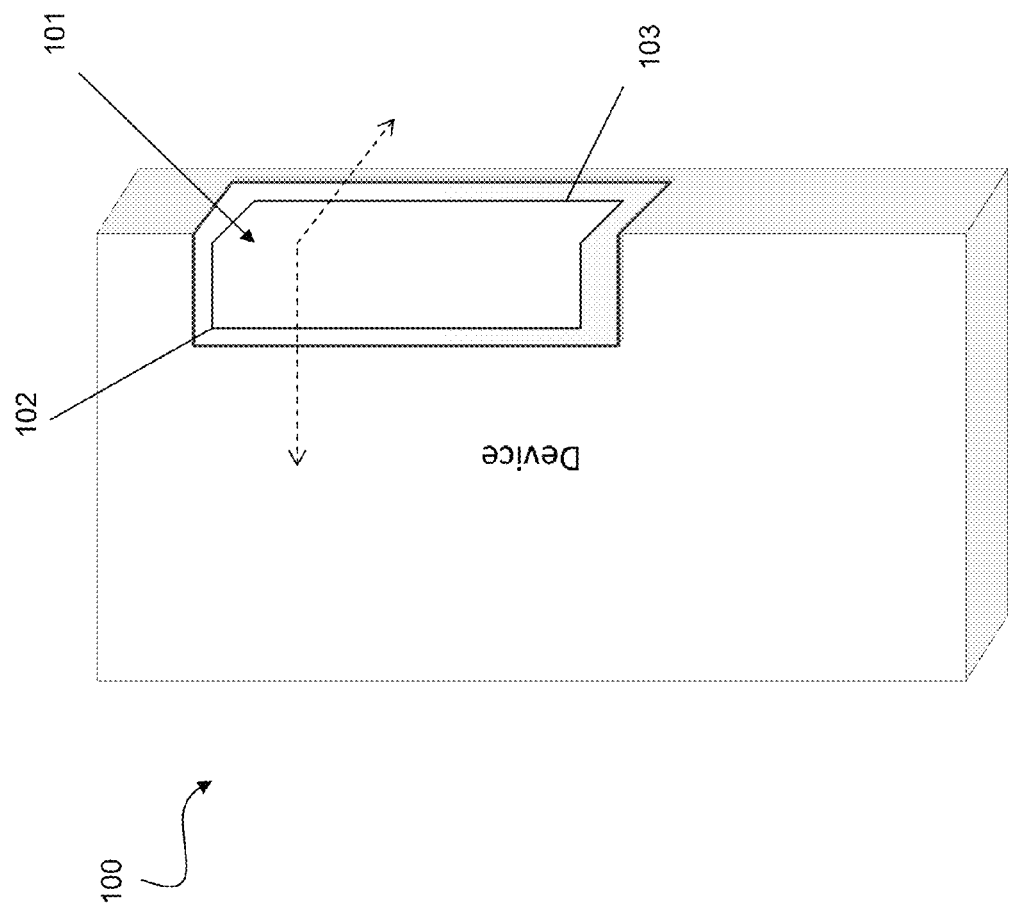
FIG. 1 an example information handling device having an example wireless coil charging system.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Wireless charging uses electromagnetic induction to transfer energy from a Tx coil to an Rx coil. When a Tx coil and an Rx coil are perpendicular to each other there is close to zero electromagnetic induction that will occur (i.e., in the Rx coil), since the flux through the Rx coil is close to zero. The maximum induction in the Rx coil occurs when the Tx and Rx coils are oriented parallel to one another.

The Rx coil has to be the same (parallel) orientation as the Tx coil in order for the energy transfer to occur in the Rx coil. Therefore, in current information handling devices having Rx coils oriented along a single charging plane, wireless energy transfer from a Tx coil (e.g., charging pad) is difficult to achieve inasmuch as it relies on the user being able to appropriately orient the information handling device relative to the charging pad. Thus, the existing coil designs only have one charging plane, and can only accommodate either horizontal or vertical orientation with a fixed placement. Given the different geometries of information handling devices (different form factors), this is sometimes quite a difficult task. For example, setting a mobile phone to stand on its' side to accommodate a vertical oriented source (Tx) coil is not easy.

An embodiment therefor provides coils (or portions of coils or coil loops) oriented along a variety of charging planes. The coils or portions of coils may be relatively flat and at an angle to one another; additionally or in the alternative, the coils or portions of coils may be curved. Thus, embodiments provide coils or portions of coils oriented along different charging planes (hereinafter, "planes"). This helps to ensure that whatever the orientation of the information handling device and the charging unit (e.g., charging pad), sufficient energy transfer there-between will be obtained. An embodiment may provide the variously oriented coils (or coil portions or loops) in one or both of the transfer side and the receiving side. Certain examples will be provided throughout this description.

The illustrated example embodiments will be best understood by reference to the figures. The following description is intended only by way of example, and simply illustrates certain example embodiments.

Referring to FIG. 1, an embodiment incorporates a coil design comprised of at least two planes provided at an angle. In the example of FIG. 1, an Rx coil system 101 of an information handling device 100 accommodates both vertical and horizontal oriented charging coils (not illustrated) by providing an Rx coil having a first portion 102 and a second portion 103, oriented substantially perpendicular to one another. An information handling device 100, such as a mobile phone, therefore can be laid on its' back naturally and work with both horizontally and vertically oriented charging source coils.

Figure 2B:
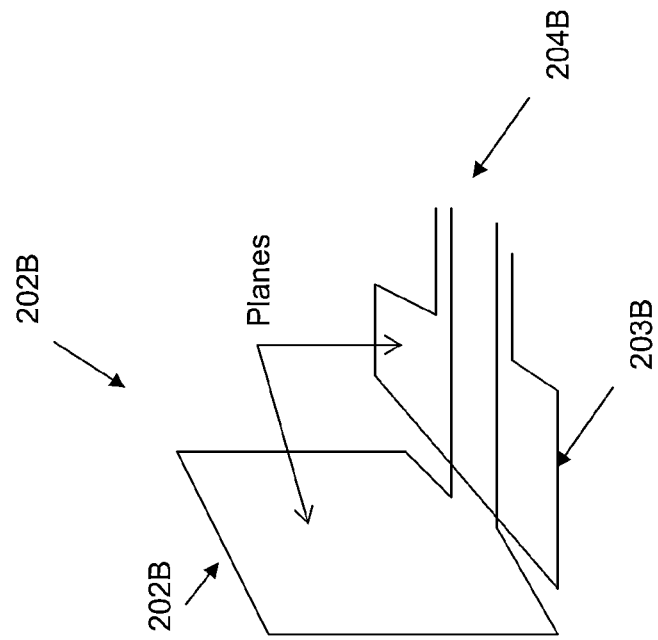
FIG. 2(A-B) illustrates examples of wireless coil charging systems.
Figure 2A:
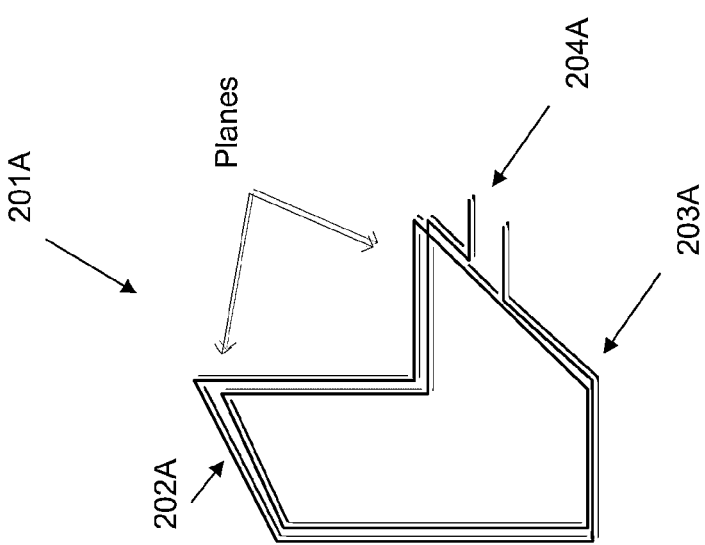

FIGS. 2A and 2B illustrate example coil orientations. The coil orientations of FIG. 2A and FIG. 2B may be Rx coils disposed within an information handling device, for example.

In FIG. 2A, a coil system 201A having a single coil is illustrated. The coil system provides a coil having a first portion 202A along a first plane and a second portion 203A along a second plane. The coil portions 202A and 203A have a coupling portion or connection 204A that couples the coil system 201A to other information handling device units, e.g., a rechargeable battery, as for example using suitable circuitry (e.g., as used in single plane coil systems).

The two planes along which the first portion 202A and second portion 203A are oriented provide the coil system 201A with the ability to receive induced charge along the planes. Thus, the coils system 201A accommodates any charging or source having coils that are aligned along the planes. When coil system 201A is provided within an information handling device, it allows the information handling device to be oriented along any of the two planes provided and receive induced charge for charging the information handling device's battery or batteries wirelessly. Suitable orientations may be chosen given the form factor in question.

In FIG. 2B, another example coil system 201B is illustrated. The coil system 201B is comprised of two coils 202B and 203B, respectively. Each of the two coils 202B and 203B is separate and oriented along a particular plane. As in the example of FIG. 2A, the coils 202B and 203B are oriented along plane which are substantially perpendicular to one another. The perpendicular orientation, when coil system 201B is incorporated into an information handling device, accommodates two different Tx coil orientations, i.e., allowing a user to align either of the first coil 202B or the second coil 203B with the transfer coils. The coil system 201B likewise includes connections 204B to other components, e.g., a rechargeable battery of an information handling device. The connections 204B may be provided as separate connections for each coil 202B and 203B.

The coil systems illustrated herein have been provided as examples. Other coil systems having more than two coils or more than two portions may be utilized. Thus, embodiments may be provided in which a plurality of coils or portions thereof are aligned at a variety of angles. Providing a variety of angles permits a variety of alignment possibilities for aligning Rx and Tx coils. Moreover, the example coils herein have been described in some respects as being Rx coils. However, similar principles may be applied in orienting the Tx coils, and thus Tx coils may be implemented according to the embodiments described herein. Thus, one or more of Rx and Tx coils may be made having two or more planes for accommodating various Rx and Tx alignments.

Figure 3:
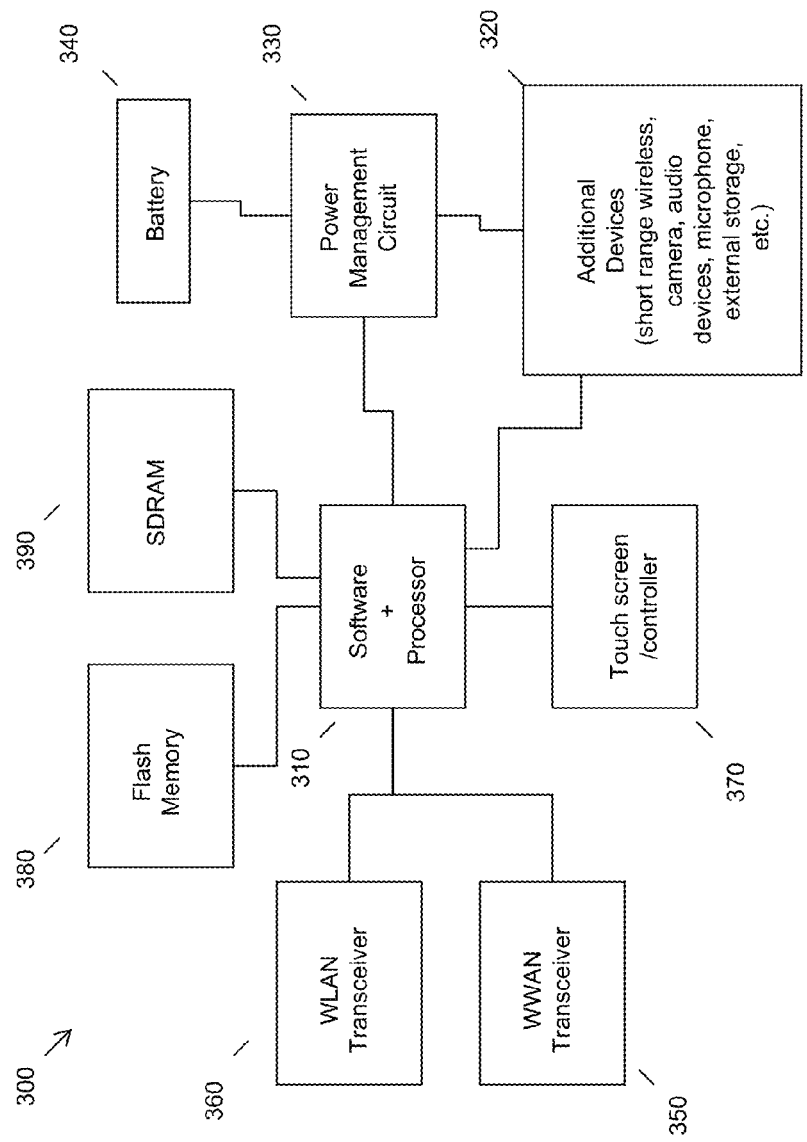
FIG. 3 illustrates an example of information handling device circuitry.

Referring to FIG. 3, while various other circuits, circuitry or components may be utilized, with regard to smart phone and/or tablet circuitry 300, an example illustrated in FIG. 3 includes an ARM based system (system on a chip) design, with software and processor(s) combined in a single chip 310. Internal busses and the like depend on different vendors, but essentially all the peripheral devices (320) may attach to a single chip 310. The circuitry 300 combines the processor, memory control, and I/O controller hub all into a single chip 310. Also, ARM based systems 300 do not typically use SATA or PCI or LPC. Common interfaces for example include SDIO and I2C.

There are power management chip(s) 330, e.g., a battery management unit, BMU, which manage power as supplied for example via a rechargeable battery 340, which may be recharged by a connection to a power source (not shown), or as discussed herein, the battery may be recharged wirelessly using a coil system. The circuitry 300 may thus be included in a device such as the information handling device of FIG. 1. In at least one design, a single chip, such as 310, is used to supply BIOS like functionality and DRAM memory.

ARM based systems 300 typically include one or more of a WWAN transceiver 350 and a WLAN transceiver 360 for connecting to various networks, such as telecommunications networks and wireless base stations. Commonly, an ARM based system 300 will include a touch screen 370 for data input and display. ARM based systems 300 also typically include various memory devices, for example flash memory 380 and SDRAM 390.

Information handling devices, as for example outlined in FIG. 1 and FIG. 3, may include coil systems, e.g., coil system 101, to recharge a rechargeable battery, e.g., battery 340. It should be noted, however, that the example device of FIG. 1 and circuitry of FIG. 3 are examples only, and other devices and circuitry may be used. Moreover, although Rx coils have been focused on herein, embodiments may be implemented as Tx coils or some suitable combination of Rx and Tx coils.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. An information handling device, comprising:
   a display device;
   one or more processors operatively coupled to the display device;
   a memory device assessable to the one or more processors and storing code executable by the one or more processors;
   one or more rechargeable batteries providing power to one or more of the one or more processors and the memory device; and
   a wireless charging coil system operatively coupled to the one or more rechargeable batteries;
   the wireless charging coil system comprising two or more coil portions oriented at an angle with respect to one another such that the two or more coil portions are aligned along two or more charging planes;
   wherein a coil portion of the two or more coil portions substantially does not transmit a charging current to the one or more rechargeable batteries.

2. The information handling device of claim 1, wherein the angle is about 90 degrees.

3. The information handling device of claim 1, wherein the two or more coil portions are oriented substantially perpendicular with respect to one another.

4. The information handling device of claim 1, wherein the two or more coil portions comprise a plurality of coil portions;
   each coil portion in the plurality of coil portions oriented at a different angle.

5. The information handling device of claim 1, wherein one coil portion of the two or more coil portions transmits a charging current to the one or more rechargeable batteries.

6. The information handling device of claim 5, wherein the charging current is induced into the one coil portion wirelessly via a source coil oriented substantially parallel to the one coil portion.

7. The information handling device of claim 1, wherein the two or more coil portions comprise portions of a single coil.

8. The information handling device of claim 1, wherein the two or more coil portions comprise two or more separate coils.

9. A wireless charging coil system, comprising:
   two or more receiving coil portions oriented at an angle with respect to one another such that the two or more receiving coil portions are aligned along two or more charging planes; and
   circuitry to operatively couple the two or more receiving coil portions to an information handling device rechargeable battery;
   wherein a coil portion of the two or more receiving coils substantially does not transmit a charging current to the rechargeable battery.

10. The wireless charging coil system of claim 9, wherein the angle is about 90 degrees.

11. The wireless charging coil system of claim 9, wherein the two or more receiving coil portions are oriented substantially perpendicular with respect to one another.

12. The wireless charging coil system of claim 9, wherein the two or more receiving coil portions comprise a plurality of receiving coil portions;
   each coil portion in the plurality of receiving coil portions oriented at a different angle.

13. The wireless charging coil system of claim 9, wherein one receiving coil portion of the two or more receiving coil portions transmits a charging current to the rechargeable battery.

14. The wireless charging coil system of claim 13, wherein the charging current is induced into the receiving one coil portion wirelessly via a source coil oriented substantially parallel to the one coil portion.

15. The wireless charging coil system of claim 9, wherein the two or more receiving coil portions comprise portions of a single coil.

16. The wireless charging coil system of claim 9, wherein the two or more receiving coil portions comprise two or more separate coils.

* * * * *